(12) United States Patent
Johnson et al.

(10) Patent No.: US 9,213,331 B2
(45) Date of Patent: Dec. 15, 2015

(54) REMOTE CONTROL SYSTEM FOR A MACHINE

(71) Applicant: Caterpillar Inc., Peoria, IL (US)

(72) Inventors: Lonny E. Johnson, Peoria, IL (US); James Mason, Peoria, IL (US); Timothy Felty, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 434 days.

(21) Appl. No.: 13/719,606

(22) Filed: Dec. 19, 2012

(65) Prior Publication Data

US 2014/0172128 A1      Jun. 19, 2014

(51) Int. Cl.
| | |
|---|---|
| *G05B 19/00* | (2006.01) |
| *G05B 19/409* | (2006.01) |
| *E02F 9/20* | (2006.01) |
| *G07C 5/00* | (2006.01) |
| *G07C 5/12* | (2006.01) |

(52) U.S. Cl.
CPC .............. *G05B 19/409* (2013.01); *E02F 9/205* (2013.01); *G07C 5/008* (2013.01); *G07C 5/12* (2013.01); *E02F 9/2004* (2013.01); *G05B 2219/36159* (2013.01); *G05B 2219/36542* (2013.01); *G05B 2219/45012* (2013.01)

(58) Field of Classification Search
None
See application file for complete search history.

(56) References Cited

U.S. PATENT DOCUMENTS

| | | | |
|---|---|---|---|
| 4,104,592 A * | 8/1978 | Ratz et al. ................... 340/13.24 |
| 4,855,822 A * | 8/1989 | Narendra et al. ............. 348/114 |
| 5,054,569 A * | 10/1991 | Scott et al. .................... 180/167 |
| 5,399,844 A | 3/1995 | Holland | |
| 5,448,479 A * | 9/1995 | Kemner et al. ................. 701/23 |
| 5,459,660 A | 10/1995 | Berra | |
| 5,469,356 A * | 11/1995 | Hawkins et al. ................ 701/48 |
| 5,551,524 A * | 9/1996 | Yamamoto et al. .......... 180/6.62 |
| 5,646,843 A * | 7/1997 | Gudat et al. ...................... 701/3 |
| 5,680,328 A | 10/1997 | Skorupski et al. | |
| 6,112,139 A * | 8/2000 | Schubert et al. .................. 701/2 |
| 6,182,006 B1 | 1/2001 | Meek | |
| 6,202,008 B1 | 3/2001 | Beckert et al. | |
| 6,246,935 B1 | 6/2001 | Buckley | |
| 6,429,773 B1 | 8/2002 | Schuyler | |
| 6,430,485 B1 | 8/2002 | Hullinger | |
| 6,633,800 B1 * | 10/2003 | Ward et al. ........................ 701/2 |
| 6,663,010 B2 | 12/2003 | Chene et al. | |
| 6,778,097 B1 * | 8/2004 | Kajita et al. .................. 340/12.5 |
| 6,782,644 B2 * | 8/2004 | Fujishima et al. .............. 37/348 |

(Continued)

OTHER PUBLICATIONS

Teleoperated Bulldozer, ASI Robots, Uploaded Mar. 3, 2010, https://www.youtube.com/watch?v=S-mgj8cZTNk.*

(Continued)

*Primary Examiner* — Darrin Dunn
*Assistant Examiner* — Christopher E Everett
(74) *Attorney, Agent, or Firm* — Leydig, Voit & Mayer, Ltd.

(57) ABSTRACT

A controller implemented method of remotely operating a machine includes determining, for each of a plurality of operating conditions of the machine, a predetermined configuration of a machine instrument array and removably mounting a portable computing device on a remote control console. The method further includes defining a configuration of a console instrument array of the remote control console in which, for each of the plurality of operating conditions, the configuration of the console instrument array is generally identically to the predetermined configuration of the machine instrument array. A system is also disclosed.

20 Claims, 10 Drawing Sheets

(56) References Cited

U.S. PATENT DOCUMENTS

| | | | |
|---|---|---|---|
| 7,032,703 B2* | 4/2006 | Wulfert et al. | 180/329 |
| 7,050,795 B2 | 5/2006 | Wiegand et al. | |
| 7,565,941 B2* | 7/2009 | Cunningham | 180/167 |
| 7,578,079 B2* | 8/2009 | Furem | 37/348 |
| 7,742,861 B2* | 6/2010 | Lee | 701/50 |
| 7,894,951 B2* | 2/2011 | Norris et al. | 701/36 |
| 8,051,936 B1* | 11/2011 | Hebert et al. | 180/167 |
| 8,106,757 B2 | 1/2012 | Brinton et al. | |
| 8,139,108 B2* | 3/2012 | Stratton et al. | 348/114 |
| 8,237,389 B2* | 8/2012 | Fitch et al. | 318/563 |
| 8,272,467 B1* | 9/2012 | Staab | 180/167 |
| 8,918,230 B2* | 12/2014 | Chen et al. | 701/2 |
| 8,977,407 B2* | 3/2015 | Dorneich et al. | 701/2 |
| 2001/0037163 A1* | 11/2001 | Allard | 700/245 |
| 2003/0036817 A1* | 2/2003 | Morley et al. | 700/245 |
| 2003/0147727 A1* | 8/2003 | Fujishima et al. | 414/200 |
| 2003/0171863 A1 | 9/2003 | Plumeier et al. | |
| 2006/0106510 A1 | 5/2006 | Heffington | |
| 2006/0195483 A1 | 8/2006 | Heider et al. | |
| 2006/0224280 A1* | 10/2006 | Flanigan et al. | 701/2 |
| 2006/0271251 A1* | 11/2006 | Hopkins | 701/23 |
| 2006/0271263 A1* | 11/2006 | Self et al. | 701/50 |
| 2007/0143482 A1 | 6/2007 | Zancho | |
| 2008/0103640 A1 | 5/2008 | Watanabe et al. | |
| 2008/0172147 A1 | 7/2008 | Taki et al. | |
| 2009/0102626 A1 | 4/2009 | Lesesky | |
| 2010/0036560 A1 | 2/2010 | Wright et al. | |
| 2010/0179844 A1 | 7/2010 | LaFergola et al. | |
| 2010/0185638 A1 | 7/2010 | Wright et al. | |
| 2010/0249957 A1 | 9/2010 | Price | |
| 2011/0257816 A1* | 10/2011 | Song et al. | 701/2 |
| 2011/0282519 A1* | 11/2011 | Carlsson | 701/2 |
| 2012/0136525 A1* | 5/2012 | Everett et al. | 701/24 |
| 2012/0209634 A1* | 8/2012 | Ling et al. | 705/4 |
| 2012/0229662 A1* | 9/2012 | Lankalapalli et al. | 348/211.8 |

OTHER PUBLICATIONS

Meehan, Christopher J., A remote control system for teleoperation of a skid-steer loader over a mobile Wi-Fi mesh network, Colorado School of Mines, M.S. Thesis, Spring 2011.*

Kwitowski, August J., etc., Teleoperation for Continuous Miners and Haulage Equipment, IEEE Transactions on Industry Applications, vol. 28, No. 5, Sep./Oct. 1992, pp. 1118-1125.*

Hainsworth, D.W., Teleoperation User Interfaces for Mining Robotics, Autonomous Robots 11, pp. 19-28, 2001.*

Coal News, vol. 8, No. 10, Oct. 2011.*

Ilstam, Anders, Sandvik Mining and Construction, Mar. 11, 2002.*

Wohlford, William P., etc., New capability for remote controlled excavation, 1989 Proceedings of the 6th ISARC, pp. 33-40, 1989.*

Henderson, Steven J. et al., "Augmented Reality for Maintenance and Repair (ARMAR)," Air Force Research Laboratory, Wright-Patterson AFB, Aug. 2007, 70 pp.

* cited by examiner

REMOTE CONTROL SYSTEM FOR A MACHINE

TECHNICAL FIELD

The disclosure generally relates to controlling machines and, more particularly, to controlling and operating machines remotely at least in part with a portable computing device.

BACKGROUND

Machines including excavators, loaders, dozers, motor graders, haul trucks, and other types of equipment are used to perform a variety of tasks. During the performance of these tasks, the machines may operate in situations that are unsuitable or undesirable for a human operator such as hazardous conditions, extreme environmental conditions, uncomfortable for an operator, or at work locations remote from civilization. Because of these factors, the completion of some tasks by an onboard operator may be dangerous, expensive, and otherwise undesirable.

One solution is to remotely control and operate the machines. However, operation of the machines often requires skilled operators. Still further, additional skills are required to operate the machines remotely. As a result, skilled machine operators that also have the ability to operate machines remotely may be difficult to locate. The lack of skilled operators may lead to delays in projects, lost income, and increased costs. Additional training may be required to develop operators qualified to operate machines remotely. The additional training may increase the costs of operation and cause additional delays.

U.S. Pat. No. 6,739,078 discloses a system for remotely controlling equipment such as a backhoe via a data network. A user may provide movement instructions via a graphical user interface at a user PC to a programmable controller interfaced to the data network and the hydraulic movement systems of the equipment. The graphical user interface includes a visual representation portion and a user control portion. A visual representation of the moveable elements of the equipment is provided to the user via the graphical user interface, and the user inputs movement instructions via the user control portion of the graphical user interface. The visual representation may be generated in response to movements of the components of the equipment.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for remotely operating a machine includes a portable computing device, wherein the portable computing device has a portable device controller and is removably mountable at a machine and at a remote control console. A machine includes a plurality of sensors for generating signals indicative of operating conditions of the machine, a visual image sensor for generating visual image signals indicative of a point of view relative to the machine, and a machine mounting location for removably mounting the portable computing device thereat. A machine instrument array includes, upon operatively mounting the portable computing device at the machine mounting location, a machine display device and a machine input device. The machine display device is configured to display information related to operation of the machine, and the machine input device is configured to receive an input command from an operator. A remote control console is configured to control the machine remotely and includes a console mounting location for removably mounting the portable computing device thereat and a console instrument array that includes, upon operatively mounting the portable computing device at the console mounting location, a console display device and a console input device. The console display device is configured to display information related to operation of the machine and the console input device is configured to receive an input command from an operator. A point of view display is configured to display an image of the point of view relative to the machine. A controller includes the portable device controller. Upon operatively mounting the portable computing device at the machine, the controller is configured to receive signals from the plurality of sensors of the machine, determine the operating conditions of the machine based upon the signals, and transmit a plurality of machine signals to the machine instrument array indicative of the operating conditions of the machine. For each operating condition, the machine instrument array has a predetermined configuration. Upon operatively mounting the portable computing device at the remote control console, the controller is further configured to receive signals from the plurality of sensors of the machine, determine the operating conditions of the machine based upon the signals, and transmit visual image signals indicative of the point of view relative to the machine to the remote control console. The controller is further configured to display point of view images on the point of view display based upon the visual image signals, transmit signals from the remote control console to the machine to direct the machine to perform desired operations, and transmit a plurality of console signals to the console instrument array indicative of the operating conditions of the machine. The console signals further define a configuration of the console instrument array and, for each operating condition, the configuration of the console instrument array is generally identically to the predetermined configuration of the machine instrument array.

In another aspect a controller implemented method of remotely operating a machine includes determining, for each of a plurality of operating conditions of the machine, a predetermined configuration of a machine instrument array, removably mounting a portable computing device having a portable device controller on a remote control console, and transmitting to the remote control console signals from a plurality of sensors operatively associated with the machine indicative of the operating conditions of the machine. The method further includes determining the operating conditions of the machine based upon the signals received from the plurality of sensors, determining a plurality of console signals indicative of the operating conditions of the machine, and defining a configuration of a console instrument array of the remote control console. For each of the plurality of operating conditions, the configuration of the console instrument array is generally identically to the predetermined configuration of the machine instrument array. The method still further includes transmitting the plurality of console signals to the console instrument array of the remote control console.

In still another aspect, a system for remote control operation of a machine includes a portable computing device that has a portable device controller and is removably mountable at the machine and at a remote control console. The machine includes a prime mover, a plurality of sensors for generating signals indicative of operating conditions of the machine, a display for displaying images related to the operating conditions of the machine, a visual image sensor for generating visual image signals indicative of a point of view relative to the machine, and a machine mounting location for removably mounting the portable computing device thereat. The machine further has a machine instrument array including, upon operatively mounting the portable computing device at the machine mounting location, a machine display device and a machine input device. The machine display device is configured to display information related to operation of the machine and the machine input device is configured to receive an input command from an operator. A remote control console is configured to control the machine remotely and includes a console mounting location for removably mounting the portable computing device thereat, a console instrument array, and a point of view display for displaying an image of the point of view relative to the machine. Upon operatively mounting the portable computing device at the console mounting location, the console instrument array includes a console display device and a console input device. The console display device is configured to display information related to operation of the machine and the console input device is configured to receive an input command from an operator. A controller, including the portable device controller, upon operatively mounting the portable computing device at the machine, is configured to receive signals from the plurality of sensors of the machine, determine the operating conditions of the machine based upon the signals, and transmit a plurality of machine signals to the machine instrument array indicative of the operating conditions of the machine. For each operating condition, the machine instrument array has a predetermined configuration. The controller, including the portable device controller, upon operatively mounting the portable computing device at the remote control console, is further configured to receive signals from the plurality of sensors of the machine, determine the operating conditions of the machine based upon the signals, and transmit visual image signals indicative of the point of view relative to the machine to the remote control console. The controller is still further configured to display point of view images on the point of view display based upon the visual image signals, transmit signals from the remote control console to the machine to direct the machine to perform desired operations, and transmit a plurality of console signals to the console instrument array indicative of the operating conditions of the machine. The console signals further define a configuration of the console instrument array and, for each operating condition, the configuration of the console instrument array is generally identically to the predetermined configuration of the machine instrument array.

DETAILED DESCRIPTION

Figure 1:
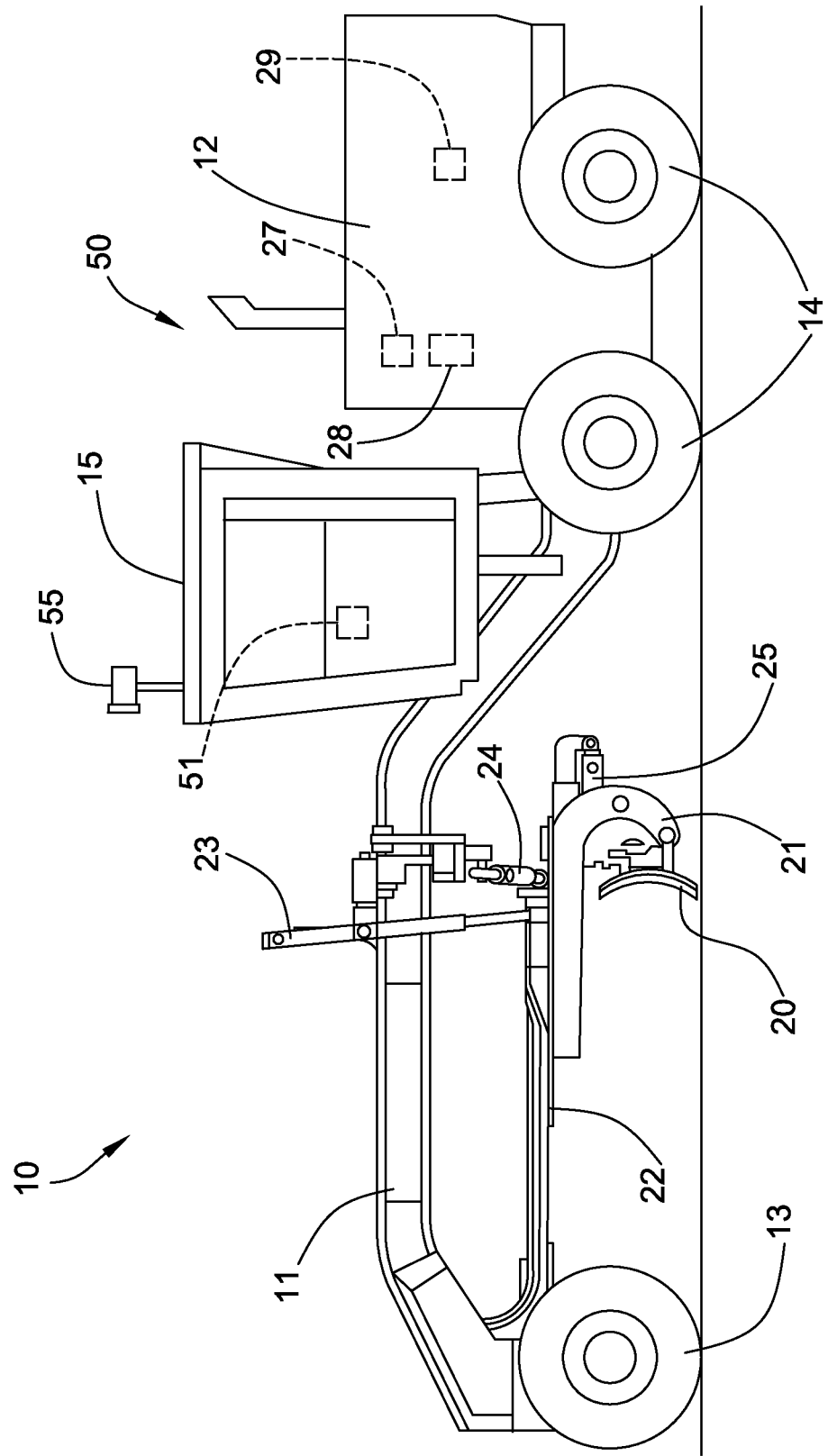
FIG. 1 is a side elevational view of a motor grader.

FIG. 1 is a diagrammatic illustration of machine 10 such as a motor grader that may be used in accordance with an embodiment of the disclosure. The motor grader includes a frame 11 and a prime mover such as an engine 12. A set of front wheels 13 may be operatively connected to the frame 11 generally adjacent a front end of the motor grader and two sets of rear wheels 14 may be operatively connected to the frame 11 generally adjacent a rear end of the motor grader. In an alternate embodiment, only a single set of rear wheels 14 may be provided. One or both sets of rear wheels 14 may be powered by a power transfer mechanism (not shown) operatively connected to the engine 12. The power transfer mechanism may be any desired type of drive system including a hydrostatic propulsion system, an electric drive system or a mechanical drive system. An operator cab 15 may be mounted on the frame 11 and may include various controls, gauges, displays and other mechanisms used by an operator.

A work implement such as a blade or moldboard 20 extends downward from the frame 11. The moldboard 20 may be mounted on a blade tilt adjustment mechanism 21 that is supported by a rotatable circle assembly 22 operatively connected to the blade tilt adjustment mechanism 21. A variety of hydraulic cylinders or actuators may be provided for controlling the position of the moldboard 20. For example, circle assembly 22 may be supported by a pair of blade lift actuators 23 (with only one visible in FIG. 1). Adjustment of the blade lift actuators 23 allows the height of rotatable circle assembly 22, and hence the height of moldboard 20, to be adjusted. Blade lift actuators 23 may be moved independently or in combination with each other. A center shift cylinder 24 may be provided to shift the circle assembly 22 from side-to-side. A blade tip cylinder 25 may be provided to control the angle between an edge of the moldboard 20 and the ground. One or more side shift cylinders (not shown) may be provided to control lateral movement of the moldboard 20 relative to the circle assembly 22. The circle assembly 22 may include a mechanism such as gear teeth to allow rotation of the moldboard 20. Other manners of positioning and controlling the moldboard 20 may be utilized if desired.

The machine 10 may be equipped with a plurality of sensors or sensing devices that gather data from various components and systems and generate signals that are directly or indirectly indicative of the performance and operating conditions of the machine. The sensors may generate signals indicative of operating conditions of the machine. Sensors may be associated with, for example, the engine 12, a transmission (not shown), a torque converter (not shown), the front wheels 13, the rear wheels 14, the operator cab 15, the moldboard 20, various actuators such as the blade lift actuators 23, the center shift cylinder 24, the blade tip cylinder 25, fluid supplies (not shown), operator input devices, a parking brake and/or other systems and components of machine 10. These sensors may automatically gather real-time data such as the operation of engine 12, the position of and load on the work implement, fluid pressure, flow rate, temperature, contamination level, and/or viscosity, fluid (i.e., fuel, oil, water, etc.) consumption rates, electric current and/or voltage levels, loading levels (e.g., payload value, percent of maximum allowable payload limit, payload history, payload distribution, etc.), transmission output ratio, and other desired information.

In addition, various sensors may be associated with the machine 10 that may be used to determine machine travel characteristics (e.g., speed, acceleration, torque, slip rate, etc.) as well as the position and orientation of machine 10. For example, an accelerometer 27 may be provided on the machine 10 to provide an acceleration signal indicative of measured acceleration of the machine 10 relative to a gravity reference. In one example, the accelerometer 27 may provide measurements in six degrees of freedom (i.e., fore-aft, lateral, and vertical directions as well as pitch, roll and yaw). In some circumstances, it may be desirable to position the accelerometer 27 generally adjacent operator cab 15 so that movement sensed by the accelerometer somewhat matches movement sensed by an operator.

Still further, a pitch rate sensor 28 (e.g., a gyroscope) may be provided on the machine 10. The pitch rate sensor 28 may be used to provide a pitch rate signal indicative of a pitch rate of the machine 10. As the machine 10 moves, the pitch rate will be indicative of the rate of change of the pitch angle of the machine. The pitch rate sensor 28 may also be used to determine the pitch and roll of the machine 10.

A position sensor 29 may sense a position of the machine 10. The position sensor 29 may include a plurality of individual sensors that cooperate to provide signals to controller 51 to indicate the position of the machine 10. The controller 51 may determine the position of the machine 10 as well as its orientation (i.e., the direction machine 10 is facing). In some instances, the position sensor 29 may be used to determine the pitch and roll of the machine 10. The position sensor 29 may be a series of global positioning system sensors, an odometer or other wheel rotation-sensing sensor, a perception based system or may use other systems such as lasers to determine the position of machine 10.

Figure 2:
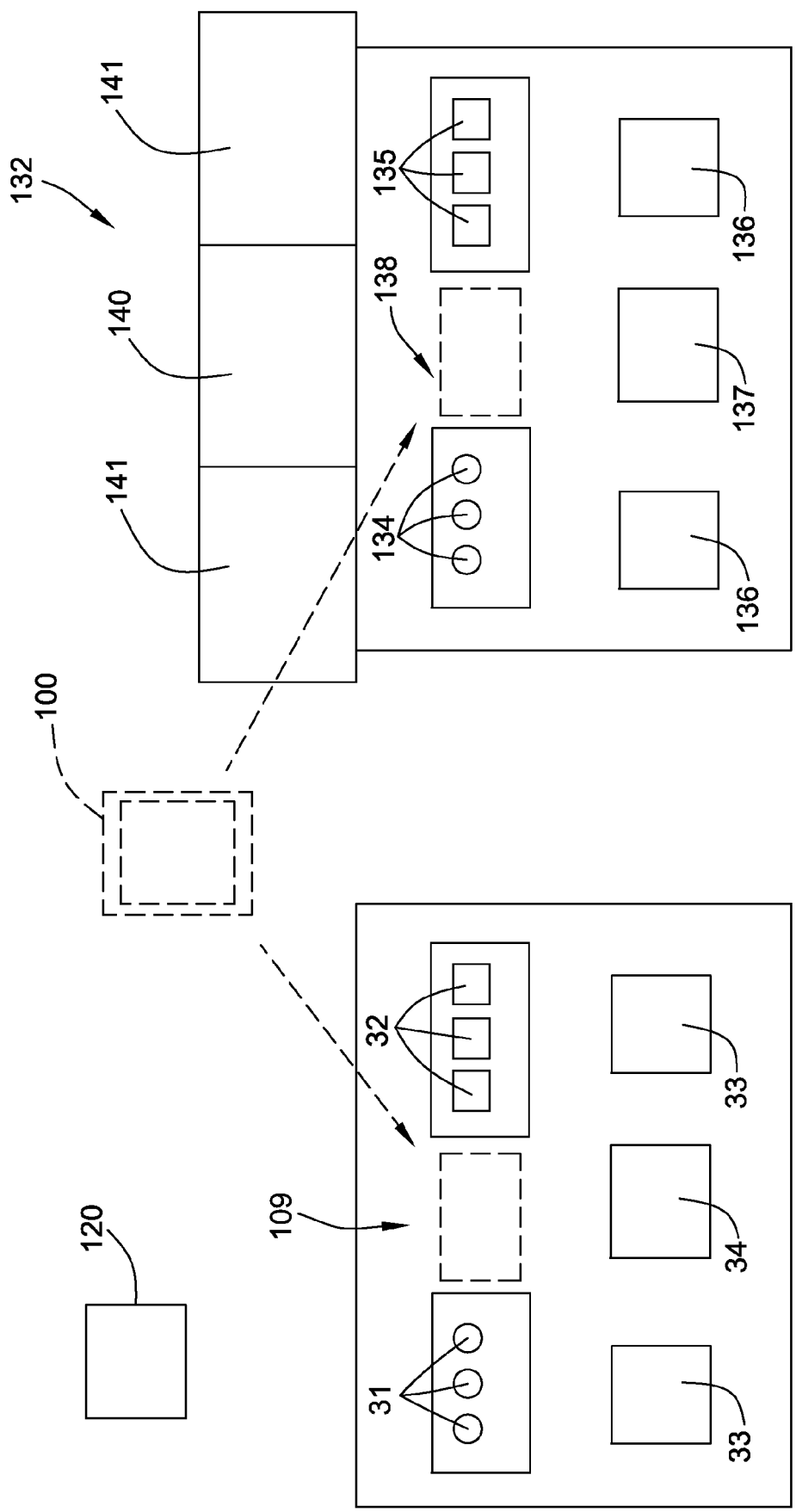
FIG. 2 is a schematic representation of an instrument array of a machine together with an instrument array of a remote control console.

As depicted schematically in FIG. 2, the operator cab 15 may include an instrument array 30 including one or more display devices and one or more input devices. Each display device may function as a machine display device for displaying images related to the operating conditions of the machine. More specifically, machine 10 may include a plurality of fixed or stationary display devices such as gauges 31 and displays 32 that are permanently mounted within the operator cab 15. As referred to herein, a gauge 31 may have a fixed functionality such that it always reflects or measures the same function (e.g., a fuel gauge, a temperature gauge, a pressure gauge). As referred to herein, a display 32 may have a modifiable or changeable functionality such that it may reflect or measure different functions (e.g., a backup camera display, machine speed, engine speed, or machine event warning display center). Each of the displays 32 may include a computer screen or some other type of display upon which an image such as a computer-generated image may be displayed. Examples of the images displayed on a machine display may include a circular dial, a color-coded indicator, a graph or any other image for conveying information.

Each input device may function as a machine input device for providing commands or data input such as inputting information, changing operations, and issuing commands to the machine 10 and to a remote system 120. More specifically, machine 10 may include a plurality of fixed or stationary input devices such as buttons, knobs, dials, levers, joysticks, and other controls that are permanently mounted within the operator cab 15. One or more of the stationary input devices may have a fixed functionality (referred to herein as a fixed function input device 33) such that they are always used to control the same function (e.g., on/off switches, cab temperature controls, pedals, radio controls). One or more of the stationary input devices may have a modifiable or changeable functionality (referred to herein as a modifiable function input device 34) such that they may be modified to control the input of different functions (e.g., cab temperature, machine lights, or engagement of auto blade position set features). Examples of modifiable function input devices 34 include a touch screen display with a computer-generated image, a knob adjacent a computer display, or any other desired input device.

Figure 3:
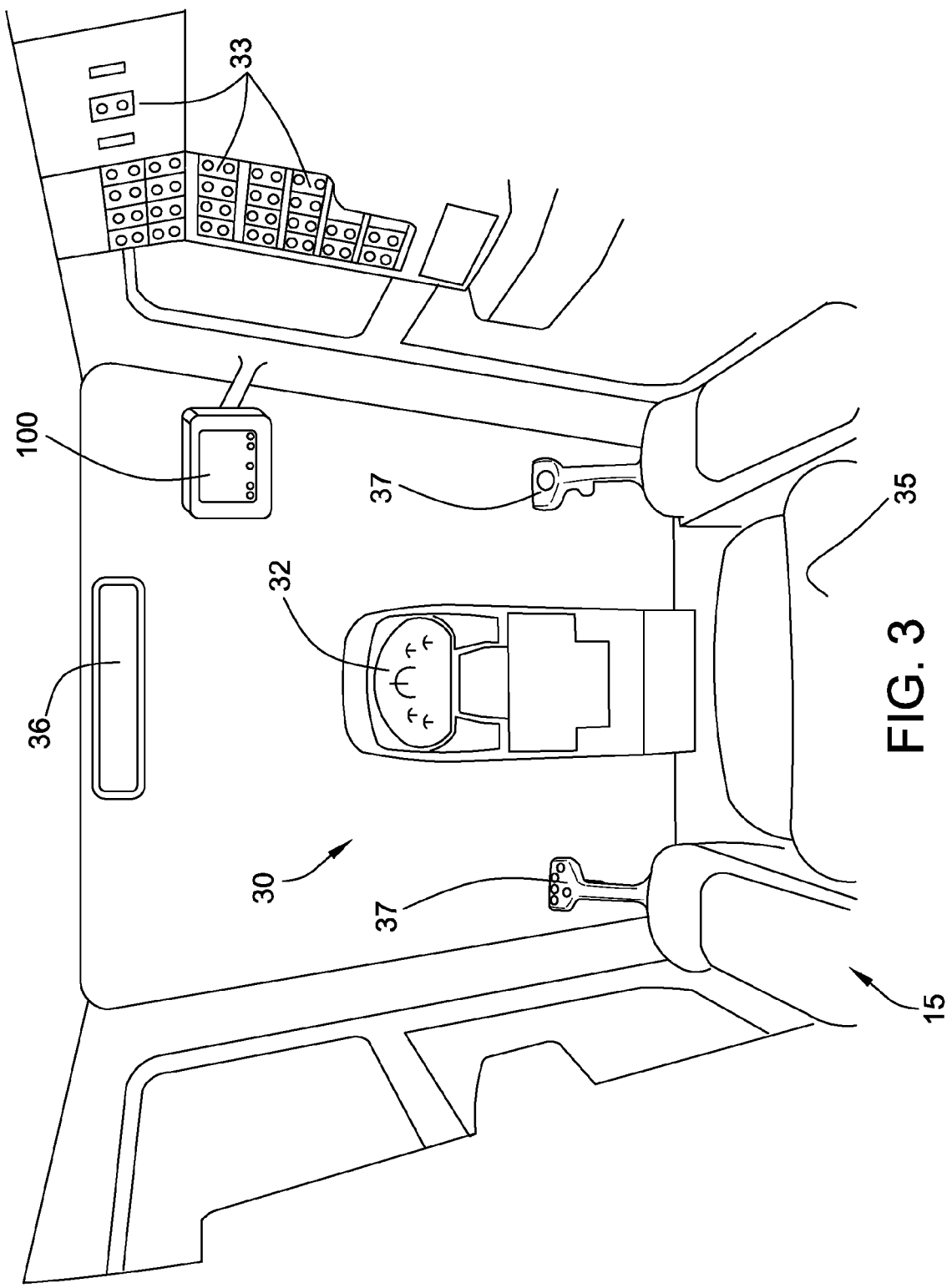
FIG. 3 is a front view of a portion of an operator cab including an instrument array.

FIG. 3 depicts a portion of an interior of operator cab 15. Operator cab 15 may include a seat 35 with an adjacent instrument array 30. The instrument array 30 may include a centrally positioned display 32 and a rear view camera display 36 positioned above the display 32. The rear view camera display 36 may be used to display other information if desired. The instrument array 30 may also include a plurality of fixed function input devices 33 in the form of switches and knobs. Still further, the instrument array may include a plurality of joysticks 37 that may function as fixed function or variable or modifiable function input devices. A portable computing device 100 may be removably mounted in operator cab 15 as described below. The portable computing device 100 may form a portion of the instrument array 30.

A control system 50 may be provided to control the operation of the machine 10. The control system 50, as shown generally by an arrow in FIG. 1 indicating association with the machine 10, may include an electronic control module such as controller 51. The controller 51 may receive operator input command signals and control the operation of the various systems of the machine 10. The control system 50 may include one or more input devices to control the machine 10 and one or more sensors to provide data and other input signals representative of various operating conditions of the machine 10.

The controller 51 is shown in FIG. 1 adjacent the operator cab 15 but may be mounted at any convenient location on machine 10. The controller 51 may be an electronic controller that operates in a logical fashion to perform operations, execute control algorithms, store and retrieve data and other desired operations. The controller 51 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 51 may be a single controller or may include more than one controller disposed to control various functions and/or features of the machine 10. In one embodiment depicted in FIG. 8, the controller 51 may include a machine controller 52 for controlling aspects of machine 10, an engine controller 53 for controller aspects of engine 12, and an implement controller 54 for controlling aspects of the work implement. In another embodiment, machine controller 52 may control aspects of the machine 10, the engine 12, and the work implement. The term "controller" is meant to be used in its broadest sense to include one or more controllers and/or microprocessors that may be associated with the machine 10 and that may cooperate in controlling various functions and operations of the machine. The functionality of the controller 51 may be implemented in hardware and/or software without regard to the functionality. The controller 51 may rely on one or more data maps relating to the operating conditions of the machine 10 that may be stored in the memory of controller. Each of these maps may include a collection of data in the form of tables, graphs, and/or equations. The controller 51 may use the data maps to maximize the efficiency of the machine 10.

Figure 4:
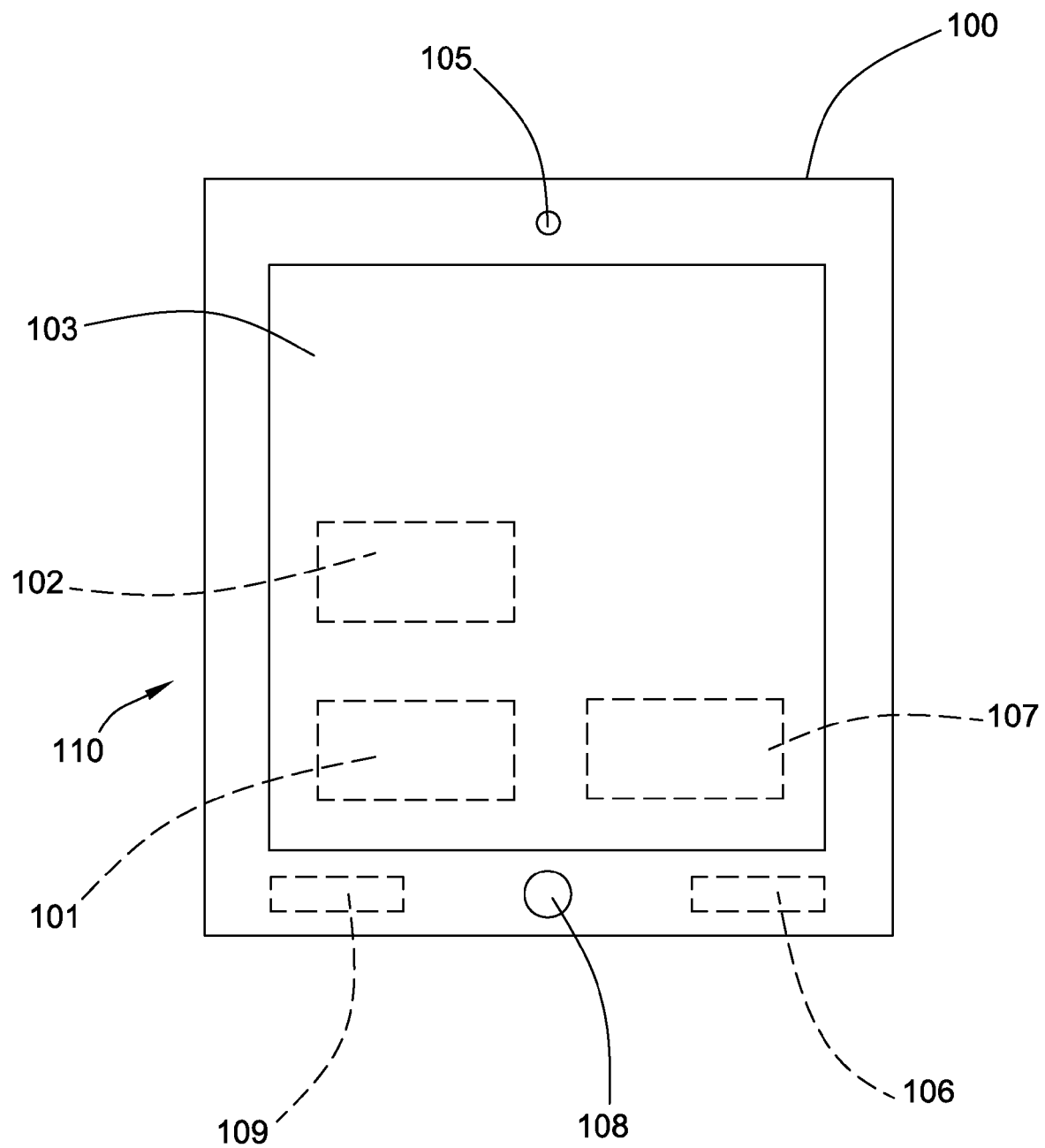
FIG. 4 is a schematic representation of a portable computing device.

As depicted in FIG. 2, a portable computing device 100 may be removably mountable on the machine. The portable computing device 100 may include a central processing unit 101 (FIG. 4), a data storage system 102 such as memory and/or a secondary storage device, and other components for running an application. The central processing unit 101, the data storage system 102, and other aspects of the portable computing device 100 may act as a portable device controller 110 that interacts with machine controller 52 as a component of the controller 51. The portable computing device 100 may also include a display 103, a communications interface such as a wireless interface 104, a camera 105, a microphone 106, a global positioning sensor 107, and one or more input devices 108. If desired, the portable computing device 100 may be removably mounted within operator cab 15 within a docking device or station. As a result, the display 103 may function as a portable device display relative to machine 10. The docking device may function as a machine mounting location 109 for removably mounting the portable computing device 100 thereat to provide power to charge the portable computing device 100 as well as provide data connections to machine 10.

The display 103 may be configured as a touch screen to also operate as a portable device input. The wireless interface 104 may provide a communications channel between the machine controller 52 and the portable computing device 100 as well as between the controller 51 and a remote system 120. In one embodiment, the wireless communication between the machine controller 52 and the portable computing device 100 may be via a Bluetooth® communications system or protocol. Other communications systems and protocols are contemplated. In an alternate embodiment, a wired communications interface (not shown) may be provided to effect the connection between the machine controller 52 and the portable computing device 100. Communication between the machine controller 52 and the portable computing device 100 may be achieved by a wireless connection that occurs once the portable computing device is within a predetermined distance of the machine 10. In another embodiment, communication between the machine controller 52 and the portable computing device 100 may be achieved by a wired connection upon mounting the portable computing device in or on the machine 10. In other words, portable computing device 100 may be configured to communicate with the machine controller wirelessly or through a wired connection.

Components of the portable computing device 100 may supplement or replace some of the components of machine 10. For example, the functionality of controller 51 may be distributed so that certain functions are performed by the machine controller 52 and other functions are performed by the portable computing device 100. In addition, sensors, displays and input devices of the portable computing device 100 may supplement or replace some of the sensors, displays, gauges, and input devices of machine 10. For example and as described in further detail below, the display 103 of the portable computing device 100 may be used to supplement or replace displays permanently mounted on the machine 10. Similarly, the wireless interface 104 of the portable computing device 100 may also be used to supplement or replace a wireless interface of the machine 10.

The camera 105 of the portable computing device 100 may be used to capture images of the work site or the machine 10. These images may be stored in the machine controller 52, in the portable computing device 100, or in a remote system 120 wirelessly connected to the controller 51. Further, the portable computing device 100 may be mounted within operator cab 15 so that camera 105 may be used to monitor actions of an operator such as tracking an operator's eyes to monitor for potential signs of fatigue. Microphone 106 of portable computing device 100 may be used to receive voice commands from an operator and provide the voice commands to the controller 51. The controller may thus be able to operate components or control certain aspects of the operation of machine 10 based upon those voice commands and thus reduce the need for additional input devices. The microphone 106 may also be used to communicate or record notes regarding the operations at the work site or the operation of the machine 10 such as noted hazards or required maintenance items. The global positioning sensor 107 of the portable computing device 100 may used to supplement or replace the sensors of position sensor 29, if desired. As a result, the display 103 and other components of the portable computing device 100 may supplement or combine with the machine display devices and the machine input devices to form a machine instrument array made up of the instrument array 30 and the portable computing device.

In an alternative embodiment, the portable computing device 100 may control and operate all aspects of the machine 10 and thus the portable computing device 100 may function as the controller 51. Regardless of whether the connection between the machine controller 52 and the portable computing device 100 is wired or wireless and regardless of whether controller 51 includes machine controller 52, aspects of the control system 50 may be located remote from the machine 10 and controller 51 may communicate wirelessly to remote system 120 that forms a part of the control system 50.

The portable computing device 100 may store as data codes a plurality of user or operator preferences such as the temperature of the operator cab 15, the settings of the seat within the operator cab 15, input device sensitivity, and desired display images based upon certain operating conditions. Upon docking the portable computing device 100 or moving it within a predetermined range in the case of a wireless connection, the machine controller 52 and the portable computing device may communicate so that controller 51 will operate with the user preferences saved within the portable computing device. The data codes may further include a user identification data code that is specific or unique to each machine operator. As a result, upon docking the portable computing device 100, the controller 51 may determine the identity of the machine operator based upon the user identification data code.

The controller 51 may be configured so that machine 10 is inoperable without portable computing device 100. For example, portable computing device 100 may have saved therein data codes such as authorization keys that prevent the operation of the machine controller 52 without such authorization keys. By requiring appropriate authorization keys, it may be possible to limit an operator's use to only certain types or models of machines 10. More specifically, each operator may be assigned a specific portable computing device 100 and that portable computing device may be set up so as to limit an operator to operate only certain types or models of machines. Still further, the portable computing device 100 may limit an operator to operating one or more specific machines.

The controller 51 may be further configured to limit the operation of machine 10 based upon data codes in the form of limited access keys stored within portable computing device 100. The limited access keys may be used to limit the types of operations performed with the machine 10 as well as limit the time or location at which the machine is operated. For example, a limited access key may be used to prevent an inexperienced operator from performing certain operations (e.g., to prevent operation without sufficient training) In another example, an operator may be prohibited from clearing certain types of data such as performance data as well as fault or error codes. The limited access keys may further be used to prevent a machine 10 from being moved outside of a predetermined area (e.g., outside of a global positioning system defined fence) or from being moved or performing certain operations outside of a predetermined range of hours or times.

Machine operators may be provided with one set or type of limited access keys while maintenance personnel may be provided with a different set or type of limited access keys. As a result, maintenance personnel may be prevented from performing certain operations such as moving a machine or operating certain implements and operators may be prevented from accessing certain components or panels of the machine that should only be accessed by maintenance personnel. Through such limited access keys, a work site manager or machine owner may be able to match the use and access to the machines 10 based upon the ability and authorization of the various personnel. Still further, a record of such use and access may be stored within the portable computing device 100 and/or communicated wirelessly to remote system 120.

As described above, the operator cab 15 may include a plurality of fixed or stationary display devices such as gauges 31 and displays 32 that are permanently mounted within the operator cab 15 as part of the machine instrument array. Other display devices may be removably mounted on the machine 10 such as within the operator cab 15. In one example, if the portable computing device 100 is removably positioned within the operator cab 15, the display 103 of the portable computing device may be used as an additional or portable display within the operator cab. As with the displays 32 that are fixed within the operator cab 15, the display 103 of a portable computing device 100 may be used to display any type of image including those that resemble gauges. The gauges 31, the displays 32, and the display 103 of the portable computing device 100 may interact to form a display system such as the instrument array 30 of machine 10.

As also described above, the operator cab 15 may include a plurality of fixed or stationary input devices such as fixed function input devices 33 and modifiable function input devices 34 that are permanently mounted within the operator cab 15. Other input devices may be removably mounted on the machine 10 such as within the operator cab 15. If the portable computing device 100 is removably positioned within the operator cab 15 and the display 103 includes touch screen functionality, a portion of the display may be used as an input device with modifiable functionality. Still further, the portable computing device 100 may include other components such as microphone 106 that may be used as input devices to control the operation of machine 10. The fixed function input devices 33, the modifiable function input devices 34, and aspects of the portable computing device 100 may interact to form an input system of machine 10.

The controller 51 may be configured to control the images displayed on each of the modifiable displays and gauges. The controller 51 may display different images depending on the operation being performed and the operating conditions of the machine 10. In one example, upon starting machine 10, the displays may indicate the machine status, the temperature of various fluids, and the fuel level. After reporting and confirming the initial levels, it may be desirable to only display this information upon a material change, at predetermined time intervals, or upon the request of an operator.

The controller 51 may change the images being displayed based upon the operation being performed. For example, in FIG. 5, a display 32 is depicted for basic operation of machine 10. The display 32 depicts various images such as a map 38, a speedometer 39, a fuel gauge image 40, and a coolant temperature gauge image 41. The display 32 may also include a gear selection image 42, a differential fluid temperature image 43, an engine oil temperature image 44, and a transmission oil temperature image 45. The display may further identify the name of the operator and an identification code at 46, the number of hours since the engine was last serviced at 47, the status of machine lights at 48.

Figure 5:
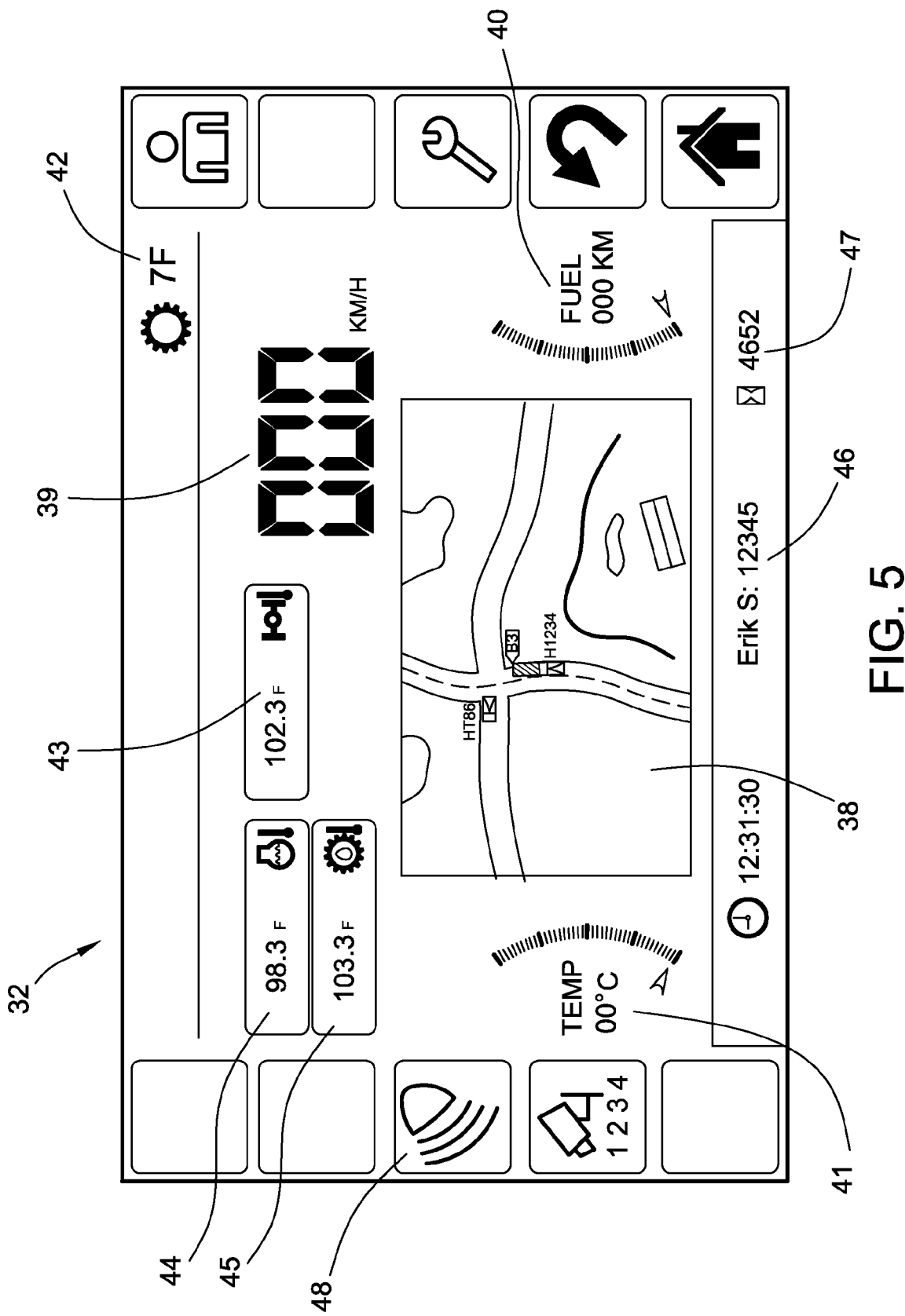
FIG. 5 is an example of images displayed on a display of the machine.
Figure 6:
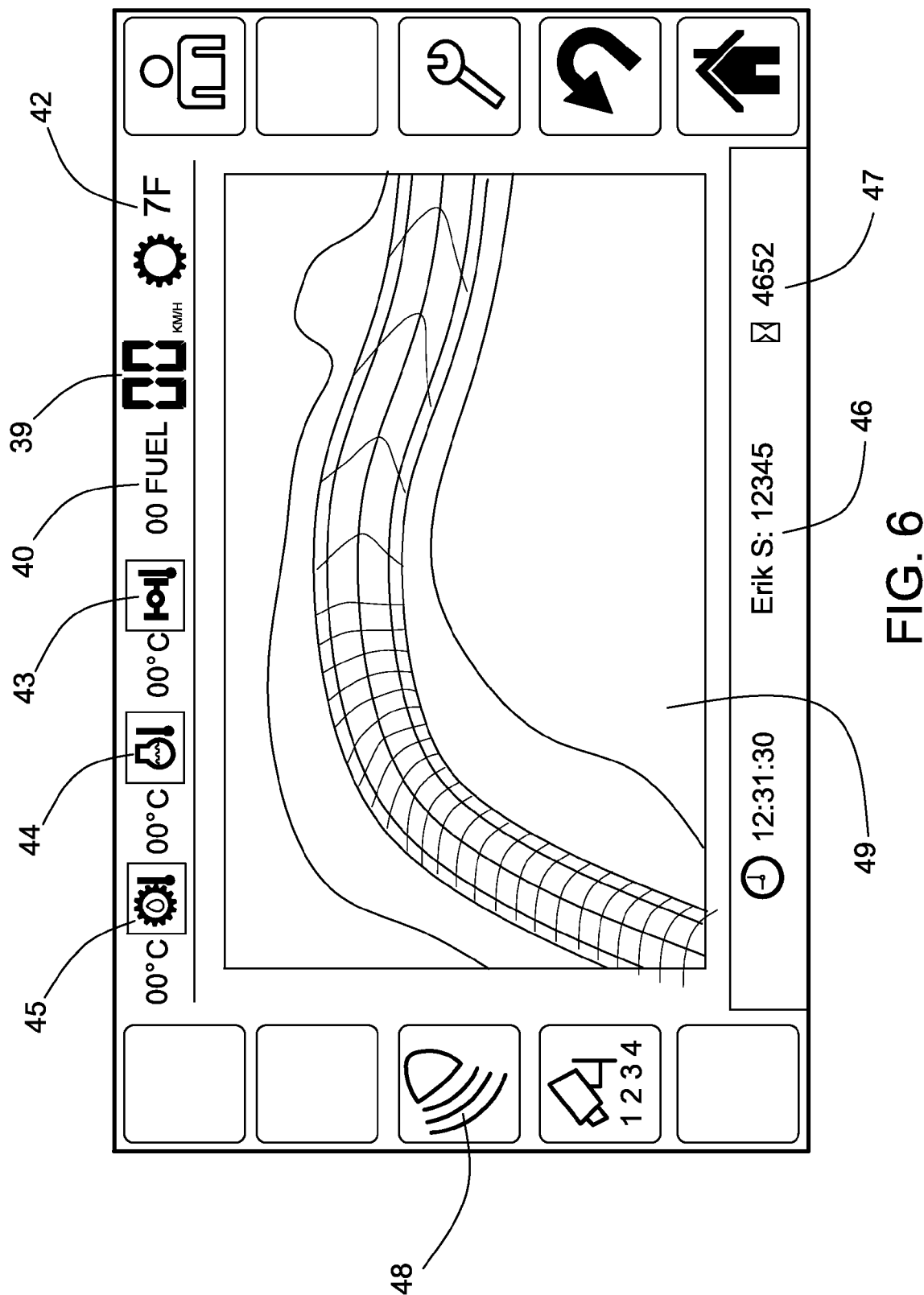
FIG. 6 is a view similar to FIG. 5 but with different images displayed based on a first machine operation.

When the motor grader is performing a grading operation, it may be desirable to only depict some of the images displayed in FIG. 5. As shown in FIG. 6, the map 38 has been replaced by an image 49 from a grade control system and the coolant temperature gauge image 41 has been removed. The speedometer 39, the fuel gauge image 40, the differential fluid temperature image 43, the engine oil temperature image 44, and the transmission oil temperature image 45 have all been moved to be in line along an upper row of the display 32. With this configuration, the operator may be primarily focused on the image 49 from the grade control system.

Figure 7:
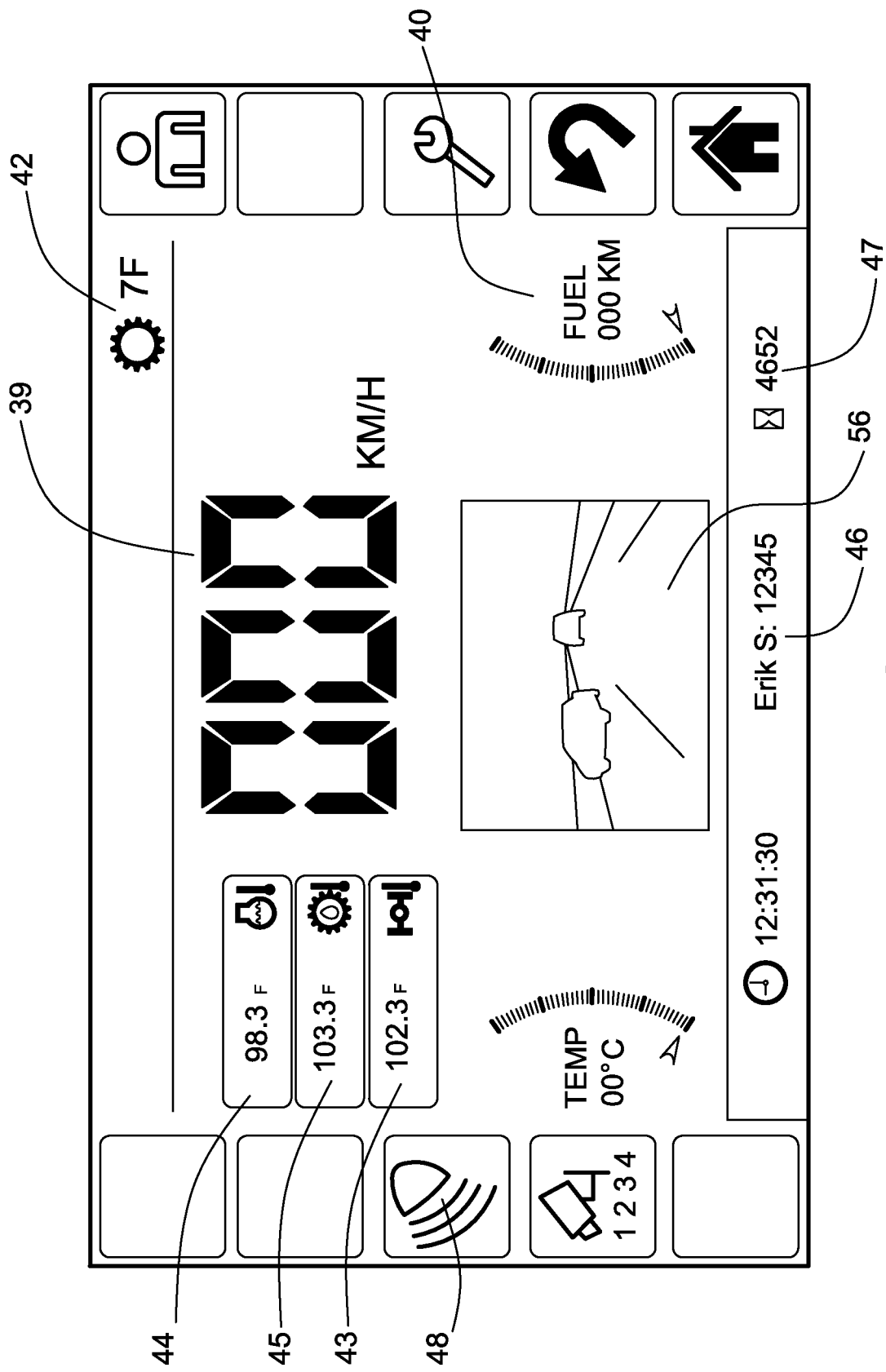
FIG. 7 is a view similar to FIG. 5 but with still different images displayed based on a second machine operation.

In another operation such as the motor grader operating on a road, different images may be displayed as depicted in FIG. 7. In such case, the speedometer 39 and images 56 from cameras depicting the area around the motor grader may be emphasized in the display 32.

If an emergency alert or alarm occurs, the controller 51 may display an image on display 32 related to the emergency alert or alarm as well as instructions as to the appropriate steps to be taken or operations to be performed. For example, if one or more of the fluid temperatures exceeds a predetermined threshold, the controller 51 may generate a warning for the operator on the display 32.

Although described above with respect to a motor grader, the present disclosure may be applicable to many other types of machines. For example, when operating a wheel loader, controller 51 may display an indication of how close the wheels are to slipping. This information may be used by an operator to maximize or increase the performance of the wheel loader. In another example, when loading an excavator or a wheel loader, the controller 51 may display mass or weight of the load in the work implement of the machine.

A visual image system 55 such as a camera system may be provided for generating visual images indicative of a point of view relative to the machine 10. The visual image system 55 may include a plurality of visual image sensors such as cameras (not shown) for generating visual image signals. The visual image signals may be transmitted wirelessly to a system remote from machine 10. In doing so, the visual image signals may be processed to some extent by controller 51 at machine 10 and subsequently transmitted to remote system 120 or transmitted to the remote system and processed by the remote system. A plurality of cameras (not shown) of the visual image system 55 may be positioned to capture different views that an operator would have from within the operator cab 15 of machine 10. In an alternate embodiment, a plurality of cameras (not shown) may be positioned to provide a point of view including the machine 10 and a portion of the work site at which the machine is operating.

An example of a remote system may be a remote control console 130 schematically depicted adjacent instrument array 30 in FIG. 2. For example, the remote control console 130 may include an instrument array such as a console instrument array 131, a point of view display 132, and a console controller 133. The console instrument array 131 may include one or more display devices and one or more input devices. Each display device may function as a console display device for displaying images related to the operating conditions of the machine. As with the machine instrument array described above, console instrument array 131 may include a plurality of fixed or stationary display devices such as gauges 134 and displays 135 that are permanently mounted at the remote control console 130. The gauges 134 of remote control console 130 may also have a fixed functionality such that they always reflect or measure the same function. The displays 135 of the remote control console 130 may also have a modifiable or changeable functionality such that they may reflect or measure different functions. Each of the displays 135 may include a computer screen or some other type of display upon which an image such as a computer-generated image may be displayed as described above with respect to displays 32.

Each input device may function as a console input device for providing commands or data input such as inputting information, changing operations, and issuing commands to the machine 10 through the remote control console 130. As with the machine instrument array described above, console instrument array 131 may include a plurality of fixed or stationary input devices such as buttons, knobs, dials, levers, joysticks, and other controls that are permanently mounted the remote control console 130. Fixed function input devices 136 of the remote control console 130 may have a fixed functionality such that they are always used to control the same function. The modifiable function input devices 137 may have a modifiable or changeable functionality such that they may be modified to control the input of different functions. The fixed function input devices 136 and the modifiable function input devices 137 may be similar to the respective fixed function input device 33 and the modifiable function input device 34 as described above.

The point of view display 132 may include one or more displays that are positioned adjacent the console instrument array 131 in a manner as desired such as for efficient operation of the remote control console 130 by an operator. In doing so, the point of view display 132 may include a plurality of displays or areas on a single display upon which visual images are displayed to depict a point of view relative to machine 10. For example, a first point of view display 140 may be centered above the console instrument array 131, and a pair of second point of view displays 141 positioned on opposite sides of the first point of view display. The first point of view display 140 may be used to display images in front of machine 10 while the second point of view displays 141 may be used to display images to the right and left of the machine. If desired, additional images of other points of view may be displayed such as behind the machine 10 or views of other aspects of the machine such as the blade.

In addition to configuring the point of view display 132 in a manner similar to that which an operator would see when operating machine 10, the console instrument array 131 of remote control console 130 may also be configured generally identically to the instrument array 30 within the operator cab 15. By positioning the various display devices and the input devices in generally the same location on the console instrument array 131, the transition of an operator moving from operating machine 10 from within the operator cab 15 to operating machine 10 from remote control console 130 may be simplified. In one example, the console display devices and console input devices of the console instrument array 131 may be generally identical in configuration and position to each of the machine display devices and the machine input devices of instrument array 30. More specifically, the console instrument array 131 may be configured so that it includes gauges 134 and displays 135 that generally match the gauges 31 and displays 32 of the machine instrument array. Similarly, fixed function input devices 136 and modifiable function input devices 137 may be provided on console instrument array 130 so that they generally match the fixed function input devices 33 and the modifiable function input devices 34 of the instrument array 30.

In an alternate embodiment, rather than build console instrument arrays 131 that match the instrument array 30 of each type of machine 10, some or all of the fixed function components of the instrument array 30 may be replaced on console instrument array 131 by images on displays 135 of the console instrument array. For example, controller 51 may generate images on the displays 135 of console instrument array 131 that are generally identical to some or all of the gauges 31 of the instrument array 30. In instances in which the images are not generally identically configured, it may still be desirable to position the images of the gauges 31 on the displays 135 in generally identical positions as compared to those on the instrument array 30.

Similarly, some or all of the fixed function input devices 33 may be replaced by modifiable function input devices 137 on console instrument array 131 in the form of images on a touch screen display or a display associated with another input device. In instances in which the input devices or images thereof are not generally identically configured, it may still be desirable to position the input devices on the console instrument array 131 in generally identical positions to those on the instrument array 30.

The console controller 133 may form a portion of controller 51 to assist in the operation of machine 10. In doing so, the console controller 133 may interact with the machine controller 52 as well as any of the other controllers associated with the machine 10 to control various functions and/or features of the machine 10.

Still further, the remote control console 130 may include a console mounting location 138 for removably mounting the portable computing device 100 thereat. As with the instrument array 30, components of the portable computing device 100 may supplement or replace some of the components of remote control console 130. For example, the display 103 of portable computing device 100 may supplement or replace aspects of the console instrument array 131. In addition, the functionality of controller 51 may be distributed so that certain functions are performed by the machine controller 52 (as well as other controllers on the machine 10), and other functions may be performed by the portable device controller 110 of portable computing device 100, and still other functions may be performed by the console controller 133. As with mounting the portable computing device 100 on the machine 10, sensors, displays and input devices of the portable computing device 100 may supplement or replace some of the sensors, displays, gauges, and input devices of remote control console 130 upon mounting the portable computing device on the remote control console. As a result, upon operatively mounting the portable computing device 100 at the console mounting location 138, the display devices of the console instrument array 131 may be configured to display information related to operation of the machine and the console input devices may be configured to receive input commands from an operator.

Through such a configuration, upon operatively mounting the portable computing device 100 at machine mounting location 109 of machine 10, the controller 51 may operate to include the machine controller 52, any other controllers on machine 10, and the portable device controller 110. The controller 51 may be configured to receive signals from the plurality of sensors of the machine 10 and determine the operating conditions of the machine based upon the signals.

For each operating condition of the machine 10, a predetermined configuration of the instrument array 30 of the machine 10 may be established or determined. If desired, a plurality of possible predetermined configurations may be stored in data maps of the controller 51. Once the operating conditions of the machine are determined, the controller 51 may transmit a plurality of signals (i.e., machine signals) to the machine instrument array indicative of the operating conditions of the machine 10. In instances in which the instrument array 30 includes displays 32, the signals may reflect the image and location of each display as well as the value of the operating condition displayed.

Upon operatively mounting the portable computing device 100 at the console mounting location 138 of remote control console 130, the controller 51 may operate to include the machine controller 52, any other controllers on machine 10, the portable device controller 110, and the console controller 133. As in the situation in which the portable computing device 100 is operatively mounted at machine, the controller 51 may receive signals from the plurality of sensors of the machine 10 and determine the operating conditions of the machine based upon the signals. The controller 51 may also transmit visual image signals from one or more visual image sensors associated with the machine 10, process the signals and display point of view images on the point of view display 132 at the remote control console 130 based upon the visual image signals.

Based upon the operating conditions of the machine 10 and the predetermined configuration of the machine instrument array for those operating conditions when the portable computing device 100 is mounted at machine 10, controller 51 may generate and transmit a plurality of signals (i.e., console signals) to the console instrument array 131. The signals may be indicative of the operating conditions of the machine and define a configuration of the console instrument array so that, for each operating condition, the configuration of the console instrument array is generally identically to the predetermined configuration of the machine instrument array. The controller 51 may further be configured to transmit signals from the remote control console 130 to the machine 10 to direct the machine to perform desired operations.

By configuring the machine 10 and the remote control console 130 to receive a portable computing device 100 having a display 103, the display forms a portion of the machine display of the machine instrument array upon mounting the portable computing device at the machine 10 and forms a portion of the console display of the console instrument array upon mounting the portable computing device at the remote control console 130. The controller 51 is configured to determine a plurality of images to be displayed based at least in part upon a set of operating conditions of the machine 10, and is further configured to display the plurality of images on the machine display upon mounting the portable device display 100 at the machine, and to display the plurality of images on the console display upon mounting the portable device display at the remote control console 130.

In instances in which the instrument array 30 further include a gauge 31 at a predetermined location on the instrument array, the controller 51 may be configured to display an image of a gauge 31 on the console display at a location on the console instrument array 131 generally corresponding to the predetermined location. In instances in which both the instrument array 30 and the console instrument array 131 include a gauge 31 and the console instrument array 131 further includes a console gauge, the machine gauge and the console gauge may be generally identically configured. Still further, in instances in which the instrument array 30 further include an input device, the console instrument array 131 may include a console input device that is generally identical to the machine input device. For example, if each of the instrument array 30 and the console instrument array 131 includes a variable or modifiable function input device, the controller 51 may be configured to determine a plurality of images to be displayed generally adjacent each modifiable function input device based at least in part upon a set of operating conditions of the machine. The controller 51 may be further configured to display the plurality of images generally adjacent the modifiable function input device 34 of the instrument array 30 upon mounting the portable computing device 100 at the machine 10, and to display the plurality of images generally adjacent the modifiable function input device 137 of the console instrument array 131 upon mounting the portable computing device at the remote control console 130.

Figure 8:
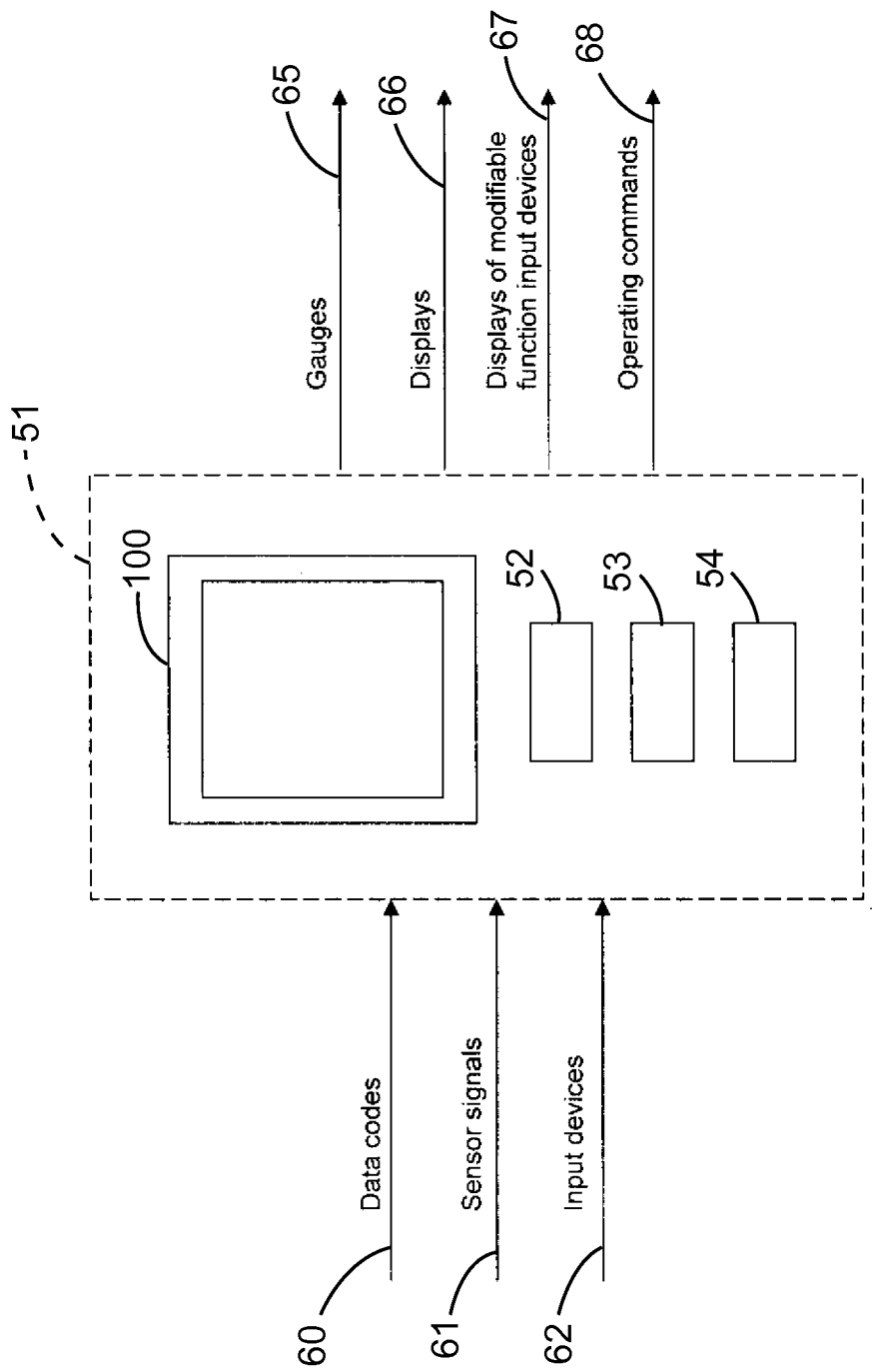
FIG. 8 is a block diagram of a control system of a machine with a portable computing device mounted thereat.

FIG. 8 depicts a control diagram upon operatively mounting the portable computing device 100 on machine 10. As depicted, the machine controller 52, the engine controller 53, the implement controller 54, and the portable device controller 110 may interact as controller 51. Controller 51 may receive, at node 60, data codes that may be stored within a data storage system 102 such as memory or a secondary storage device of portable computing device 100. In some embodiments, it may possible for the data codes to be stored within a remote system 120 and transferred to controller 51 such as by the portable computing device 100. The data codes may include user preferences for setting aspects of the machine 10 that may be set by an operator such as the temperature of the operator cab 15, setting of the seat within the operator cab, and input device sensitivity. By storing the user preferences on the portable computing device 100, each machine 10 may be configured to an operator's desired characteristics upon docking the portable computing device 100 within the machine. As a result, the amount of time necessary to set up a machine 10 when being used by a new operator may be minimized.

Additional data codes may include authorization keys so that an operator may only use those machines for which proper authorization has been received. Still further, the data codes may include limited access keys so that only certain types of operations may be performed by an operator or other personnel (e.g., a mechanic) based upon the stored limited access keys.

At node 61, the controller 51 may receive signals from the various sensors associated with various aspects of machine 10 as well as any sensors associated with portable computing device 100. At node 62, the controller 51 may receive signals from various input devices associated with machine 10 and portable computing device 100.

The controller 51 may generate various output signals based upon the data codes received at node 60, the sensor signals received at node 61, and the signals from the input devices received at node 62. At node 65, the controller 51 may generate output signals that are transmitted to the gauges 31. In other words, the controller 51 may generate signals that are transmitted to the display devices in which the function is fixed. At node 66, the controller 51 may generate signals or images that are transmitted to the displays 32. More specifically, based upon the user preferences, the operating conditions of the machine 10, and any input commands from an operator, the controller 51 may determine the information to be displayed on the displays 32. In doing so, the controller 51 may also determine which images should be displayed on the display 103 of the portable computing device 100. At node 67, the controller 51 may generate signals or images that are transmitted to displays associated with the modifiable function input devices 34 including any associated with portable computing device 100. At node 68, the controller 51 may generate operating commands to control the operation of machine 10.

Figure 9:
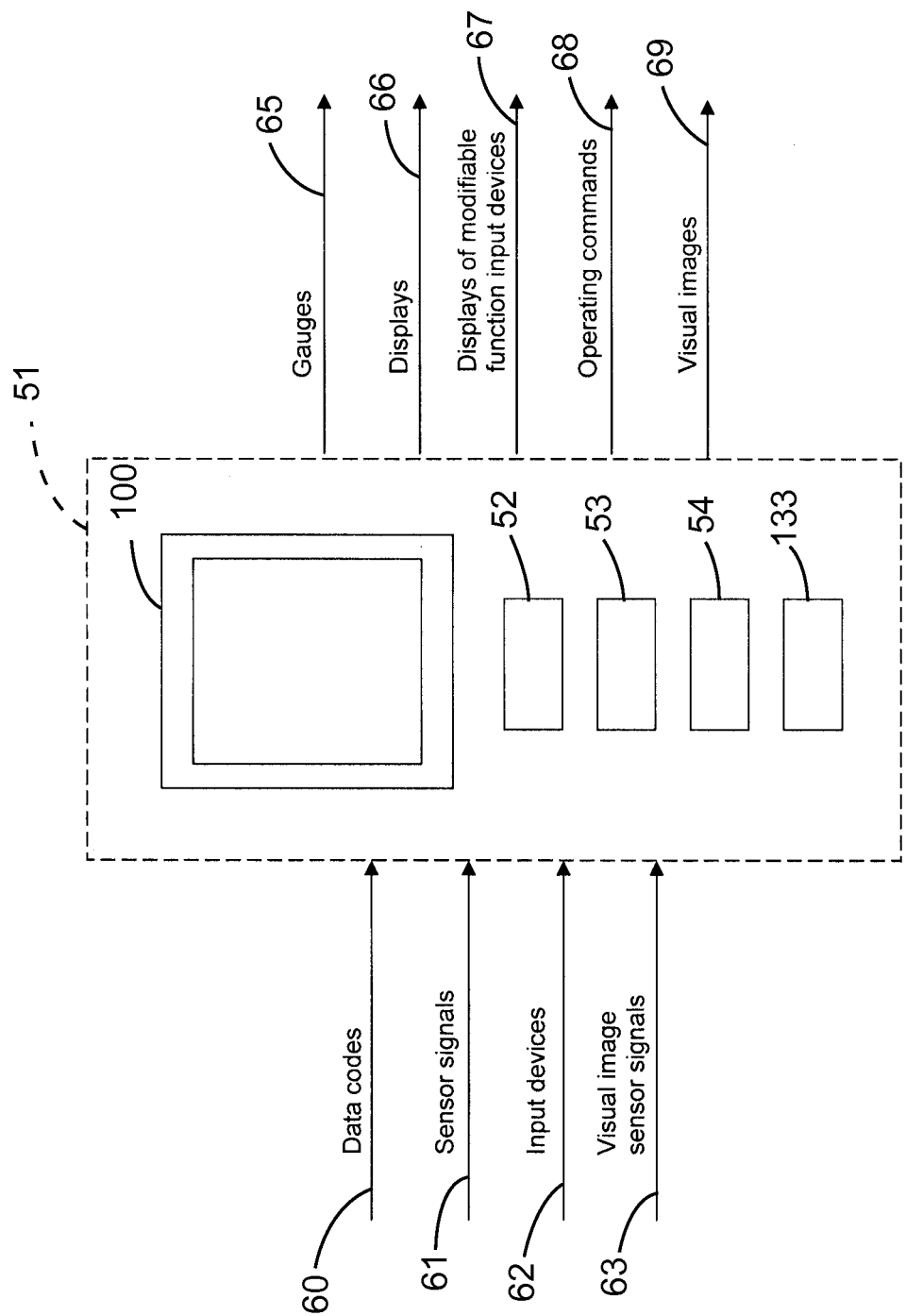
FIG. 9 is a block diagram of a control system of a machine with a portable computing device mounted at a remote control console.

FIG. 9 depicts a control diagram upon operatively mounting the portable computing device 100 on remote control console 130. FIG. 9 is similar to FIG. 8 and like reference numbers are used to depict like components and nodes. As depicted, the machine controller 52, the engine controller 53, the implement controller 54, the portable device controller 110, and the console controller 133 may interact as controller 51. Functions of controller 51 may be distributed as desired amongst the various sub-controllers. Controller 51 may receive, at node 60, a plurality of data codes as described above.

At node 61, the controller 51 may receive signals from the various sensors associated with various aspects of machine 10 as well as any sensors associated with portable computing device 100. At node 62, the controller 51 may receive signals from various input devices associated with remote control console 130 and portable computing device 100. At node 63, the controller may receive signals from visual image system 55 indicative of a point of view relative to the machine 10.

The controller 51 may generate various output signals based upon the data codes received at node 60, the sensor signals received at node 61, the signals from the input devices received at node 62, and the visual image signals received at node 63. At node 65, the controller 51 may generate output signals that are transmitted to the gauges 134 of the remote control console 130. In other words, the controller 51 may generate signals that are transmitted to the display devices in which the function is fixed. At node 66, the controller 51 may generate signals or images that are transmitted to the displays 135. More specifically, based upon the user preferences, the operating conditions of the machine 10, and any input commands from an operator, the controller 51 may determine the information to be displayed on the displays 135 of remote control console 130. In addition, the controller 51 may determine which images should be displayed on the display 103 of the portable computing device 100. At node 67, the controller 51 may generate signals or images that are transmitted to displays associated with the modifiable function input devices 137 including any associated with portable computing device 100. At node 68, the controller 51 may generate operating commands to control the operation of machine 10. At node 69, the controller 51 may generate images to be displayed on the point of view display 132.

Figure 10:
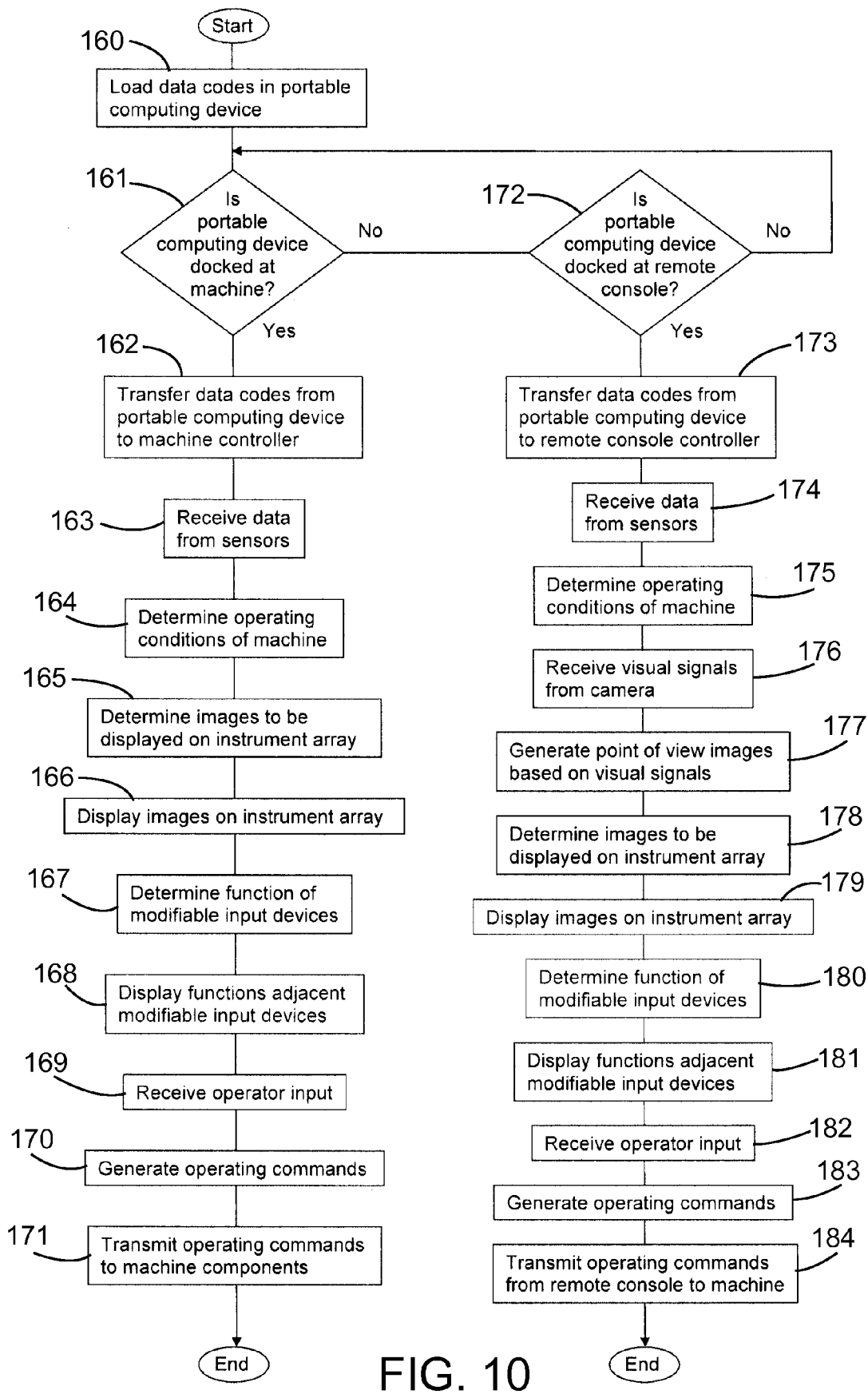
FIG. 10 is a flowchart illustrating a process for operating with an operator in the machine or in a remote control console.

FIG. 10 depicts a flowchart of a process for operating machine 10 alternatively with either with an operator located in the operator cab 15 or located at a remote control console 130. At stage 160, data codes may be entered or loaded into portable computing device 100. The data codes may limit the types of machines that the owner of the portable computing device 100 may operate, may limit the types of operations that may be performed by the machine 10, and may set user preferences including desired images to be displayed based upon certain operating conditions encountered by machine 10. At decision stage 161, the controller 51 may determine whether the portable computing device is removably mounted or docked at machine 10. If the portable computing device is docked at machine 10, data codes may be transferred at stage 162 from the portable computing device to the machine controller 52.

At stage 163, the controller 51 may receive data from the various sensors associated with the machine 10 and portable computing device 100. At stage 164, the controller 51 may determine the operating conditions of the machine 10 based upon the data received from the sensors at stage 163. At stage 165, the controller 51 may determine based at least in part on the operating conditions of the machine which images should be displayed on the displays 32 of the machine and which images should be displayed on the display 103 of the portable computing device 100. As such, the instrument array 30 may have a predetermined configuration for each operating condition.

More specifically, for some operating conditions, the predetermined configurations may be identical and for other operating conditions, the predetermined conditions may be different. As an example, when machine 10 is performing certain tasks or operations, it may be desirable to show certain operating conditions of the machine 10 such as the pressure associated with certain of the hydraulic cylinders of the machine. In other situations, it may be desirable to depict the position of blade relative to a ground reference. At stage 166, the controller 51 may transmit a plurality of machine signals to the instrument array 30 to configure the instrument array so that it will reflect the operating conditions of the machine 10.

If any of the input devices are configured as modifiable function input devices 34, the controller 51 may determine at stage 167 the function of each modifiable function input device. In addition, the controller 51 may generate at stage 168 a signal to display an image generally adjacent to such modifiable function input devices 34 so as to communicate the functionality to an operator within operator cab 15.

At stage 169, the controller 51 may receive various input signals from an operator. At stage 170, the controller may generate operating commands to operate the machine 10 as desired based upon the data codes, signals received from the sensors, and the input from the operator. At stage 171, the controller 51 may transmit the operating commands to the various machine components to operate machine 10 as desired.

If the portable computing device 100 was not removably mounted or docked at machine 10 at decision stage 161, the controller 51 may determine at decision stage 172 whether the portable computing device 100 is docked at the remote control console 130. If the portable computing device 100 is not docked at either the machine 10 or the remote control console 130, the controller 51 may enter a standby mode in which it waits for the portable computing device to be docked in either the machine 10 or the remote control console 130.

If the portable computing device 100 is removably mounted or docked at the remote control console 130, the machine 10 may be operated from the remote control console in generally the same manner as if the operator were located in the operator cab 15. In doing so, it may be desirable for the console instrument array 131 to generally be configured in the same manner as the instrument array 30 of machine 10 and for the console instrument array 131 to operate generally in the same manner as instrument array 30. Upon mounting the portable computing device 100 at remote control console 130, data codes may be transferred at stage 173 from the portable computing device to the console controller 133. In an alternate embodiment, the data codes may be transferred to other portions of controller 51.

At stage 174, the controller 51 may receive data from the various sensors associated with the machine 10 and portable computing device 100. At stage 175, the controller 51 may determine the operating conditions of the machine 10 based upon the data received from the sensors at stage 163. At stage 176, visual image signals indicative of the point of view relative to the machine 10 may be transmitted from machine 10 to the remote control console 130. At stage 177, point of view images may be generated and displayed on the point of view display 132 based upon the visual image signals received from the visual image system 55 on machine 10.

At stage 178, the controller 51 may determine based at least in part on the operating conditions of the machine 10 which images should be displayed on the displays 135 of the remote control console 130 and which images should be displayed on the display 103 of the portable computing device 100. As such, the instrument array 30 may have a predetermined configuration for each operating condition. In one embodiment, it may be desirable for the images to be displayed on the displays 135 of the remote control console 130 to be generally identical to those displayed on the displays 32 of the machine 10 for the same set of operating conditions. In other embodiments, the images displayed on the displays 135 may not be generally identical to those displayed on displays 32 of machine 10 but it may still be desirable for the images to be in generally identical positions. In that manner, it may be easier for an operator familiar with operating machine 10 to operate the machine through remote control console 130. In other words, if an operator is familiar with the configuration and location of the various displays on the machine 10, remote operation of the machine will likely be simplified if the various displays are similarly configured and located on the remote control console 130. In the absence of similarly configured images, remote operation may still be simplified if the location of the images remains generally consistent.

At stage 179, the controller 51 may transmit a plurality of console signals to the console instrument array 131 to configure the console instrument array so that it will reflect the operating conditions of the machine 10.

If any of the input devices are configured as modifiable function input devices 137, the controller 51 may determine at stage 180 the function of each modifiable function input device. In addition, the controller 51 may generate at stage 181 a signal to display an image generally adjacent to such modifiable function input devices 137 so as to communicate the functionality to an operator at the remote control console 130.

At stage 182, the controller 51 may receive various input signals from an operator. At stage 183, the controller may generate operating commands to operate the machine 10 as desired based upon the data codes, signals received from the sensors, and the input from the operator. At stage 184, the controller 51 may transmit the operating commands from the remote control console 130 to the machine controller 51 to operate the various machine components of machine 10 as desired.

Industrial Applicability

The industrial applicability of the system described herein will be readily appreciated from the foregoing discussion. The foregoing discussion is applicable to machines that may be operated by remote control. Machine 10 and remote control console 130 may each be configured to receive a portable computing device 100 thereat. In one embodiment, each of the machine 10 and the remote control console 130 may be inoperable without the portable computing device 100.

The instrument array 30 of the machine 10 and the console instrument array of the remote control console 130 may be generally identically configured. In one embodiment, each of the display devices and input devices may be identically configured and generally identical images displayed for each operating condition of machine 10. In another embodiment, displays may be used to display images that are generally identical to gauges and input devices of the other the instrument array. In still other embodiments, the gauges, input devices and images display may not be generally identical from one instrument array to the other but it may still be desirable for the images to be in generally identical positions. Such a configuration may simplify the transition of a machine operator from operating a machine 10 from within the operator cab 15 to operating the machine via remote control.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for remotely operating a machine, the machine being configured to perform a plurality of different operations, the system comprising:
a portable computing device, the portable computing device being removably mountable at the machine and at a remote control console, the portable computing device including a portable device controller;
the machine including:
a plurality of sensors for generating first and second signals, the first signals being indicative of an operation being performed by the machine and the second signals being indicative of operating conditions of the machine;
a visual image sensor for generating visual image signals indicative of a point of view relative to the machine;
a machine mounting location for removably mounting the portable computing device thereat;
a machine instrument array including, upon operatively mounting the portable computing device at the machine mounting location, a machine display device and a machine input device, the machine display device being configured to display information related to operation of the machine, the machine input device being configured to receive an input command from an operator; and a remote control console configured to control the machine remotely, the remote control console including:

a console mounting location for removably mounting the portable computing device thereat;

a console instrument array including, upon operatively mounting the portable computing device at the console mounting location, a console display device and a console input device, the console display device being configured to display information related to operation of the machine, the console input device being configured to receive an input command from an operator;

a point of view display for displaying an image of the point of view relative to the machine; and a controller including the portable device controller, and upon operatively mounting the portable computing device at the machine, the controller is configured to:

store a plurality of configurations of the machine instrument array;

receive first and second signals from the plurality of sensors of the machine;

determine which of the plurality of different operations is being performed based upon the first signals;

determine the operating conditions of the machine based upon the second signals;

for each operation being performed and each operating condition, select one of the plurality of configurations of the machine instrument array;

transmit a plurality of machine signals to the machine instrument array indicative of the operating conditions of the machine; and display the operating conditions of the machine on the machine instrument array using the selected configuration of the machine instrument array; and upon operatively mounting the portable computing device at the remote control console, the controller is further configured to:

store a plurality of configurations of the console instrument array;

receive first and second signals from the plurality of sensors of the machine;

determine which of the plurality of different operations is being performed based upon the first signals;

determine the operating conditions of the machine based upon the second signals;

for each operation being performed and each operating condition, select one of the plurality of configurations of the console instrument array, the configuration of the console instrument array being generally identical to the configuration of the machine instrument array;

transmit visual image signals indicative of the point of view relative to the machine to the remote control console;

display point of view images on the point of view display based upon the visual image signals;

transmit signals from the remote control console to the machine to direct the machine to perform desired operations;

transmit a plurality of console signals to the console instrument array indicative of the operating conditions of the machine; and display the operating conditions of the machine on the console instrument array using the selected configuration of the console instrument array.

2. The system of claim 1, wherein the portable computing device further includes a portable device display, and the portable device display forms only a portion of the machine instrument array upon mounting the portable computing device at the machine and forms only a portion of the console instrument array upon mounting the portable computing device at the remote control console.

3. The system of claim 2, wherein the console instrument array includes a console display and the controller determines images to be displayed on the console display and the portable device display based upon the operating conditions of the machine.

4. The system of claim 1, wherein the machine instrument array includes a machine display and the console instrument array includes a console display.

5. The system of claim 4, wherein the controller is configured to determine a plurality of images to be displayed based at least in part upon a set of operating conditions of the machine, and is further configured to display the plurality of images on the machine display upon mounting the portable device display at the machine, and to display the plurality of images on the console display upon mounting the portable device display at the remote control console.

6. The system of claim 1, wherein the machine instrument array further includes a machine gauge at a predetermined location on the machine instrument array, the console instrument array includes a console display, and the controller is configured to display an image of a gauge on the console display at a location on the console instrument array generally corresponding to the predetermined location.

7. The system of claim 6, wherein the machine instrument array further includes a machine gauge and the console instrument array further includes a console gauge, the machine gauge and the console gauge being generally identically configured.

8. The system of claim 1, wherein the console instrument array includes a console input device generally identical to the machine input device.

9. The system of claim 1, wherein each of the machine instrument array and the console instrument array includes a modifiable function input device, and the controller is configured to determine a plurality of images to be displayed generally adjacent each modifiable function input device based at least in part upon a set of operating conditions of the machine, and is further configured to display the plurality of images generally adjacent the modifiable function input device of the machine instrument array upon mounting the portable computing device at the machine, and to display the plurality of images generally adjacent the modifiable function input device of the console instrument array upon mounting the portable computing device at the remote control console.

10. The system of claim 1, wherein the portable computing device includes at least one input device for providing data input to the controller.

11. The system of claim 10, wherein the portable computing device is configured to receive voice commands from an operator and the controller is configured to operate components of the machine based upon the voice commands.

12. The system of claim 1, wherein the machine includes a machine controller, and the portable computing device is configured to communicate with the machine controller wirelessly.

13. The system of claim 1, wherein the machine includes a machine controller, and the portable computing device is configured to communicate with the machine controller through a wired connection.

14. The system of claim 1, wherein the portable computing device is configured to wirelessly communicate with a remote system distinct from the machine.

15. The system of claim 1, wherein the portable computing device further includes a portable device input to receive an input command from an operator, and the portable device input forms a portion of the machine instrument array upon mounting the portable computing device at the machine and forms a portion of the console instrument array upon mounting the portable computing device at the remote control console.

16. A system for remote control operation of a machine, the machine being configured to perform a plurality of different operations, comprising:
- a portable computing device, the portable computing device being removably mountable at the machine and at a remote control console, the portable computing device including a portable device controller;
- the machine including:
- a prime mover;
- a plurality of sensors for generating first and second signals, the first signals being indicative of an operation being performed by the machine and the second signals being indicative of operating conditions of the machine;
- a display for displaying images related to the operating conditions of the machine; and
- a visual image sensor for generating visual image signals indicative of a point of view relative to the machine;
- a machine mounting location for removably mounting the portable computing device thereat;
- a machine instrument array including, upon operatively mounting the portable computing device at the machine mounting location, a machine display device and a machine input device, the machine display device being configured to display information related to operation of the machine, the machine input device being configured to receive an input command from an operator;
- a remote control console configured to control the machine remotely, the remote control console including:
- a console mounting location for removably mounting the portable computing device thereat;
- a console instrument array including, upon operatively mounting the portable computing device at the console mounting location, a console display device and a console input device, the console display device being configured to display information related to operation of the machine, the console input device being configured to receive an input command from an operator;
- a point of view display for displaying an image of the point of view relative to the machine; and
- a controller including the portable device controller, and upon operatively mounting the portable computing device at the machine, the controller is configured to:
- store a plurality of configurations of the machine instrument array;
- receive first and second signals from the plurality of sensors of the machine;
- determine which of the plurality of different operations is being performed based upon the first signals;
- determine the operating conditions of the machine based upon the second signals;
- for each operation being performed and each operating condition, select one of the plurality of configurations of the machine instrument array;
- transmit a plurality of machine signals to the machine instrument array indicative of the operating conditions of the machine; and
- display the operating conditions of the machine on the machine instrument array using the selected configuration of the machine instrument array; and
- upon operatively mounting the portable computing device at the remote control console, the controller is further configured to:
- store a plurality of configurations of the console instrument array;
- receive first and second signals from the plurality of sensors of the machine;
- determine which of the plurality of different operations is being performed based upon the first signals;
- determine the operating conditions of the machine based upon the second signals;
- for each operation being performed and each operating condition, select one of the plurality of configurations of the console instrument array, the configuration of the console instrument array being generally identical to the configuration of the machine instrument array;
- transmit visual image signals indicative of the point of view relative to the machine to the remote control console;
- display point of view images on the point of view display based upon the visual image signals;
- transmit signals from the remote control console to the machine to direct the machine to perform desired operations;
- transmit a plurality of console signals to the console instrument array indicative of the operating conditions of the machine; and
- display the operating conditions of the machine on the console instrument array using the selected configuration of the console instrument array.

17. A method of remotely operating a machine, comprising:
- storing a plurality of configurations of a machine instrument array;
- storing a plurality of configurations of a console instrument array;
- receiving first and second signals from a plurality of sensors associated with the machine, the first signals being indicative of an operation being performed by the machine and the second signals being indicative of operating conditions of the machine;
- determining the operation being performed by the machine based upon the first signals received from the plurality of sensors;
- determining the operating conditions of the machine based upon the second signals received from the plurality of sensors;
- removably mounting a portable computing device on a remote control console, the portable computing device having a portable device controller;
- selecting, for each operation being performed and each operating condition, one of the plurality of configurations of the machine instrument array that would displayed if the portable computing device were mounted on the machine;
- selecting, for each operation being performed and each operating condition, one of the plurality of configurations of the console instrument array, the configuration of the console instrument array being generally identical to the selected configuration of the machine instrument array;
- transmitting visual image signals indicative of a point of view relative to the machine to the remote control console;
- displaying point of view images on the point of view display based upon the visual image signals;

transmitting signals from the remote control console to the machine to direct the machine to perform desired operations;

transmitting a plurality of console signals to the console instrument array indicative of the operating conditions of the machine; and displaying the operating conditions of the machine on the console instrument array based upon the plurality of console signals.

18. The method of claim 17, further including determining a plurality of images to be displayed based at least in part upon a set of operating conditions of the machine, displaying the plurality of images on a machine display of the machine instrument array upon mounting the portable device display at the machine, and displaying the plurality of images on a console display of the console instrument array upon mounting the portable device display at the remote control console.

19. The method of claim 17, further including determining a plurality of images to be displayed generally adjacent a modifiable function input device based at least in part upon a set of operating conditions of the machine, displaying the plurality of images generally adjacent a modifiable function input device of the machine instrument array upon mounting the portable computing device at the machine, and displaying the plurality of images generally adjacent a modifiable function input device of the console instrument array upon mounting the portable computing device at the remote control console.

20. The method of claim 17, further including the portable computing device receiving voice commands from an operator and operating components of the machine based upon the voice commands.

* * * * *